(12) United States Patent
Skovbjerg et al.

(10) Patent No.: US 12,275,176 B2
(45) Date of Patent: Apr. 15, 2025

(54) MOLD TOOL FOR INJECTION MOLDING

(71) Applicant: LEGO A/S, Billund (DK)

(72) Inventors: Bo Skovbjerg, Billund (DK); Henrik Jochumsen, Billund (DK)

(73) Assignee: LEGO A/S, Billund (DK)

( * ) Notice: Subject to any disclaimer, the term of this patent is extended or adjusted under 35 U.S.C. 154(b) by 113 days.

(21) Appl. No.: 18/549,411

(22) PCT Filed: Mar. 9, 2022

(86) PCT No.: PCT/EP2022/055960
§ 371 (c)(1),
(2) Date: Sep. 7, 2023

(87) PCT Pub. No.: WO2022/189471
PCT Pub. Date: Sep. 15, 2022

(65) Prior Publication Data
US 2024/0165864 A1    May 23, 2024

(30) Foreign Application Priority Data

Mar. 10, 2021  (DK) .............................. PA202170107

(51) Int. Cl.
*B29C 45/26* (2006.01)
*B29C 33/38* (2006.01)
*B33Y 80/00* (2015.01)

(52) U.S. Cl.
CPC ...... *B29C 45/2606* (2013.01); *B29C 33/3842* (2013.01); *B29C 45/2673* (2013.01); *B33Y 80/00* (2014.12); *B29K 2905/12* (2013.01)

(58) Field of Classification Search
CPC ............ B29C 33/3842; B29C 45/2606; B29C 45/2673
See application file for complete search history.

(56) References Cited

U.S. PATENT DOCUMENTS

2008/0011417 A1    1/2008  Manuel et al.

FOREIGN PATENT DOCUMENTS

| CN | 207643508 U | 7/2018 |
| DE | 102018002628 A1 | 10/2019 |
| GB | 2570926 A1 | 8/2019 |

(Continued)

OTHER PUBLICATIONS

International Search Report and Written Opinion in International Application No. PCT/EP2022/055960, dated Jul. 5, 2022, 9 pages.

(Continued)

*Primary Examiner* — James Sanders

(74) *Attorney, Agent, or Firm* — Day Pitney LLP; George Chaclas; Anthony A. Kassas

(57) ABSTRACT

An injection-molding tool comprising at least two separate mold plates each having a mold insert socket with a mold insert attached in the mold insert socket. Each mold plate have mutually opposite and parallel abutting side faces defining the thickness of the mold plate and a number of mutually aligned guide bushings forming through holes adapted for axially sliding one of the mold plates with respect to the other on a common guide pin in a direction perpendicular to the abutting side faces of the mold plates. The guide bushings and the mold insert socket of at least one mold plate am interconnected via one or more connection plates each extending parallel to the abutting side faces and having a thickness of less than half the thickness of the mold plate.

17 Claims, 4 Drawing Sheets

(56) References Cited

FOREIGN PATENT DOCUMENTS

| | | |
|---|---|---|
| WO | 9008022 A1 | 7/1990 |
| WO | 2013189608 A2 | 12/2013 |
| WO | 2016124432 A1 | 8/2016 |
| WO | 2018073822 A1 | 4/2018 |

OTHER PUBLICATIONS

DK Office Action and Search Report in PA 2021 70107, dated Aug. 11, 2021, 8 pages.

MOLD TOOL FOR INJECTION MOLDING

CROSS-REFERENCE TO RELATED APPLICATIONS

The present application is a U.S. National Stage Application of: International Application No. PCT/EP2022/055960, filed Mar. 9, 2022 and published on Sep. 15, 2022 as WO2022/189471 A1, which claims benefit and priority of Denmark Patent Application No. PA 2021 70107, filed on Mar. 10, 2021, each of which is incorporated herein by reference in its entirety for any purpose whatsoever.

FIELD OF THE DISCLOSURE

The present disclosure relates to an injection-molding tool, and more particularly to an injection-molding tool for mounting in an injection-molding apparatus for automated molding of work pieces in plastics, said injection-molding tool, in its closed position, having at least two separate mold plates each having a mold insert socket with a mold insert attached in the mold insert socket, each mold plate have mutually opposite and parallel abutting side faces defining the thickness of the mold plate, and the mold plates further comprises a number of mutually aligned through holes forming guide bushings adapted for axially sliding one of the mold plates with respect to the other on a common guide pin in a direction perpendicular to the abutting side faces of the mold plates.

BACKGROUND

Injection-molding tools of the aforementioned type are known in many different embodiments and they are most often produced by machining various parts such as guide bushings and sockets for mold inserts into a single massive steel plate.

In relation to this type of injection molding tools it is important, in order to reduce wear and tear but also to ensure a high quality of the molded products, to ensure correct alignment of the mold inserts mounted in the mold plates.

In this relation, for example, U.S. Pat. No. 4,372,740 discloses a tool for injection molding where the mold inserts are mounted in the mold insert sockets in the mold plates such that they can slide and tilt in the mold insert socket under the influence of hydrostatic pressure of a fluid arranged in a closed space behind each mold insert.

SUMMARY

Based on this, it is the object of the present disclosure to provide an injection-molding tool with mold plates allowing correct alignment of the mold inserts in the mold insert sockets and at the same having a more simple construction.

According to the present disclosure, this object is obtained by an injection molding tool as mentioned in the introduction and where the through holes and the mold insert socket of at least one mold plate are interconnected via one or more connection plates each extending parallel to the abutting side faces and having a thickness of less than half the thickness of the mold plate.

Thereby, the mold plate is significantly more flexible than e.g. mold plates made from a single and massive steel plate, and therefore the mold plate can compensate e.g. for variations in e.g. the thickness of the mold insert.

In this connection, the term 'mold insert' is meant to define separate parts of the injection molding tool that can be released from the mold plates, and especially those forming the mold cavity or cavities of the injection molding tool or, for example, mold inserts forming the sprue channel and/or the runners channels arranged in the mold plates.

In a preferred embodiment, the through holes and the mold insert socket of at least one mold plate are interconnected via two mutually spaced connection plates.

In this relation, each of the two mutually spaced connection plates forms one of the mutually opposite and parallel abutting side faces.

Furthermore, the mold insert socket and the guide bushings may preferably extend between the two connection plates.

In a preferred embodiment of the disclosure, the outer periphery of the two mutually spaced connection plates are at least partly interconnected by a peripheral flange and the peripheral flange may preferably extend perpendicular to the mutually opposite and parallel abutting side faces.

In this relation, the mold plate preferably forms a closed space extending between the two mutually spaced connection plates and the peripheral flange.

In a preferred embodiment of the disclosure, the mold plate is produced by additive manufacturing as single integral unit, and an especially flexible unit can be achieved by producing the mold plate by additive manufacturing using a polymer material.

In this relation the support material used for additive manufacturing of the mold plate is advantageously left inside the closed space.

Where the mold plate is made from a polymer material, at least the mold insert is preferably made from a metal material, such as steel.

In this relation, also the guide bushings may advantageously each comprise a metal bushing mounted in a bushing socket formed as an integral part of the additive manufactured mold plate.

BRIEF DESCRIPTION OF THE DRAWINGS

In order that the disclosure may be more clearly understood, one or more embodiments thereof will now be described, by way of example only, with reference to the accompanying drawings.

DETAILED DESCRIPTION

Figure 1:
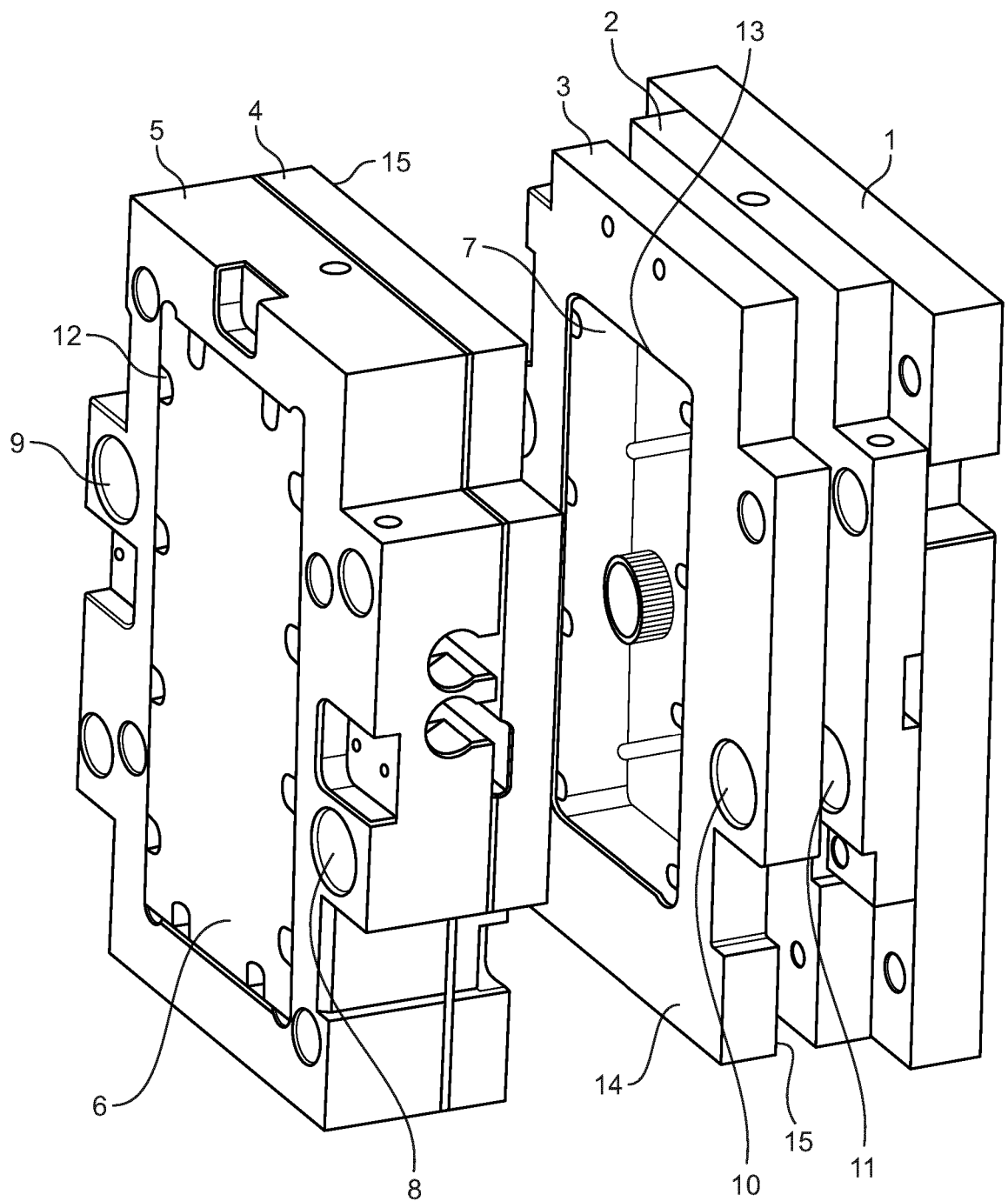
FIG. 1 is a perspective drawing showing an injection molding tool.

The subject technology overcomes many of the prior art problems associated with mold tools. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

FIG. 1 shows an injection molding tool comprising a set of mold plates. Injection molding tools of this type is known in many different embodiments comprising two or more mold plates and with different functionality depending on, for example, the design of the product that is molded in the injection molding tool. The embodiment shown here is therefore only an example of the construction of such an injection molding tool where the mold plates includes a clamping plate 1, a support plate 2, a runner/stripper plate 3, a runner channel plate 4 and a mold plate 5 forming one side of the mold cavity (the other side is not shown) in the drawings. The skilled person would easily recognize that the present disclosure may also be applied to injection molding tools having more or less mold plates with other functions than the mold plates shown in FIG. 1.

The mold plates thereby forms a stack, where each mold plate 1, 2, 3, 4 and 5 have mutually opposite and parallel abutting side faces (14, 15, defining the thickness of the mold plate 1, 2, 3, 4, 5).

Each of the mold plates 1, 2, 3, 4 and 5 according to FIG. 1 further comprises a mold insert 6, 7 which, in this context, covers any component that can be separated from the mold plate and especially components having a cavity or channel for leading the molten plastic material, such as an insert forming the mold cavity, the runner channels, the sprue or the like.

The injection molding tool shown in FIG. 1 could be made in the conventional manner where each of the mold plates 1, 2, 3, 4 or 5 are made from a massive plate of steel.

According to the present disclosure, however, one or more of the injection mold plates may be made from one or more connection plates connecting the guide bushings with the mold insert sockets and where the connection plates are thinner than the thickness of the injection mold plate.

Figure 2:
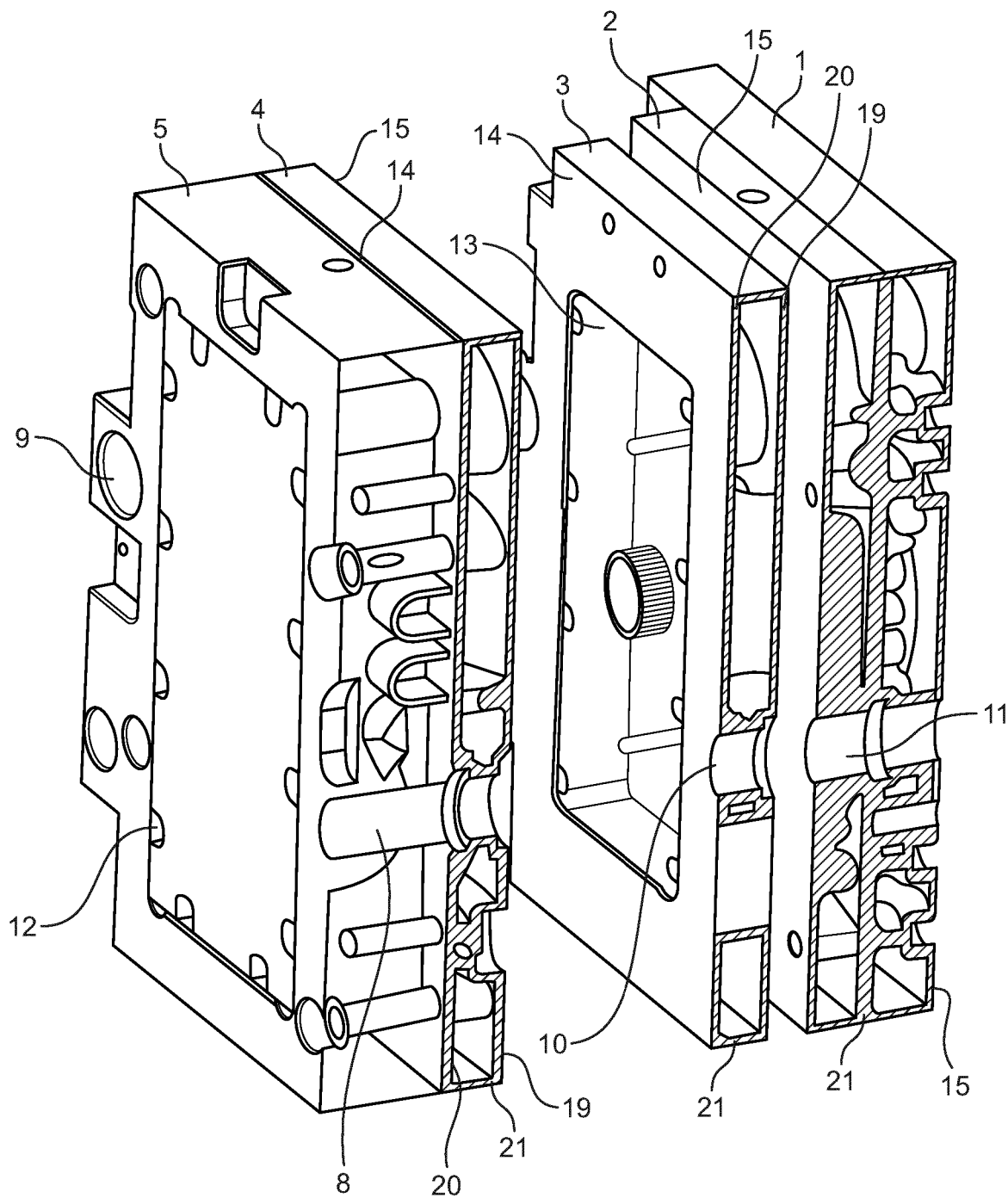
FIG. 2 is a perspective cross-sectional drawing showing an embodiment of the injection molding tool according to FIG. 1 and according to the disclosure.
Figure 3:
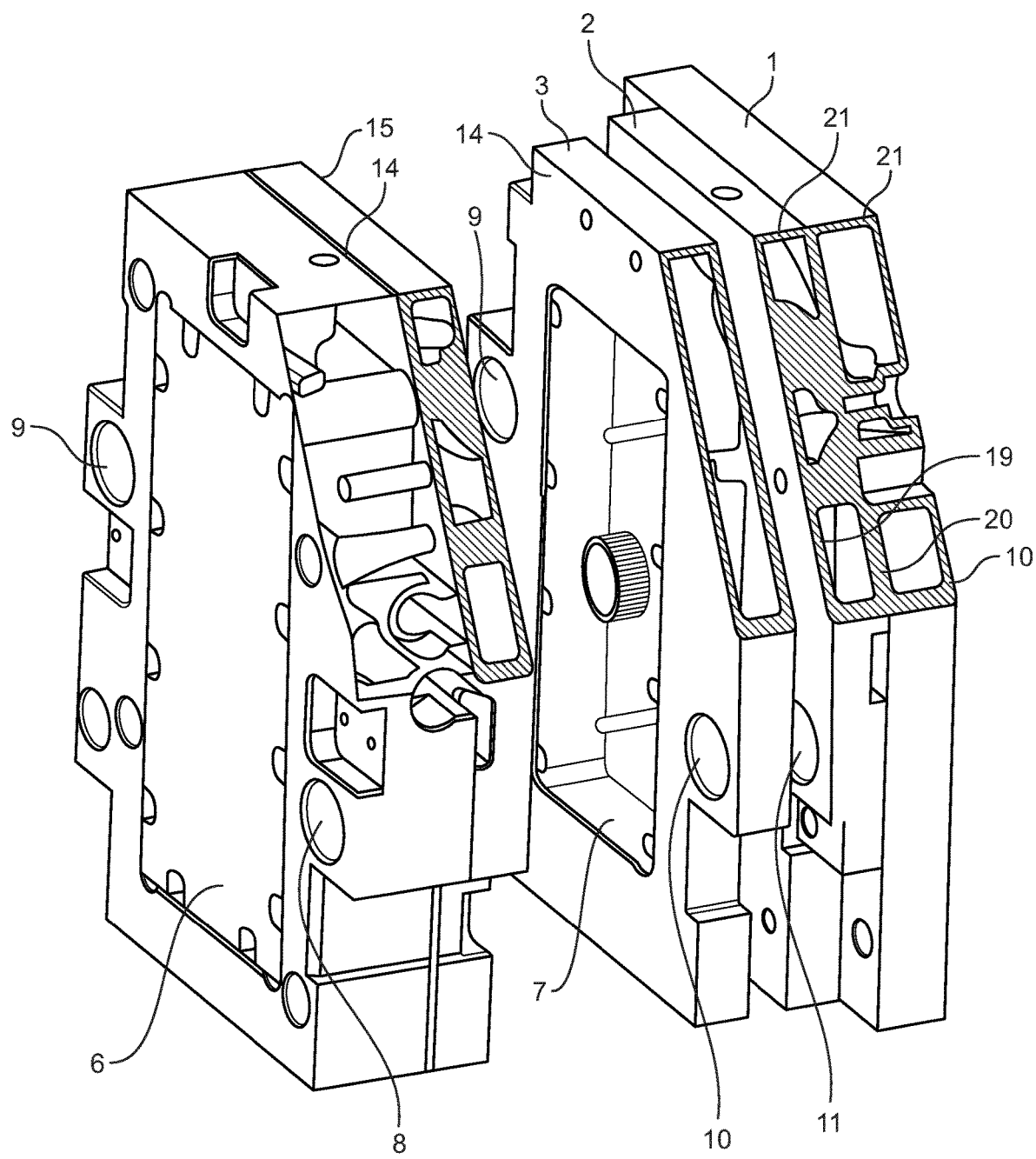
FIG. 3 is a second perspective cross-sectional drawing showing the embodiment of the injection molding tool shown in FIG. 1.

Furthermore, according to one embodiment of the present disclosure, and as shown in FIGS. 2 and 3, the mold plates 1, 2, 3, 4 are each advantageously made by additive manufacturing from especially a plastic or polymer material. Each mold plate 1, 2, 3, 4 and 5 comprises two guide bushings 8, 9, 10, 11, and one guide bushing on one mold plate is aligned with a similar guide bushing on another mold plate, so that the mold plates can slide axially with respect to the other on a common guide pin (not shown).

Each of the mold plates 1, 2, 3, 4 and 5 further comprises a mold insert socket 12, 13 for releasably insertion of a mold insert 6, 7.

According to the embodiment of the disclosure shown in FIGS. 2 and 3, each of the mold plates 1, 2, 3, 4 and 5 comprises two connection plates 19, 20 interconnecting the guide bushings 8, 9, 10, 11 with the mold insert sockets 12, 13. The two connection plates 19, 20 on each injection mold plate 1, 2, 3, 4, 5 forms the mutually opposite and parallel abutting surfaces 14, 15 on that injection mold plate 1, 2, 3, 4, 5.

The periphery of the connection plates 19, 20 are furthermore connected along their complete periphery by a peripheral flange 21 so that the connection plates 19, 20 form a closed space together with the peripheral flange 21. Although it is not shown in FIGS. 2 and 3, it is thereby possible to produce the injection mold plates by additive manufacturing and by keeping the support material used during the manufacturing process inside the closed and hollow space in the injection mold plate in order to provide some resistance to unwanted deformations of the connection plates 19, 20 in use.

Figure 4:
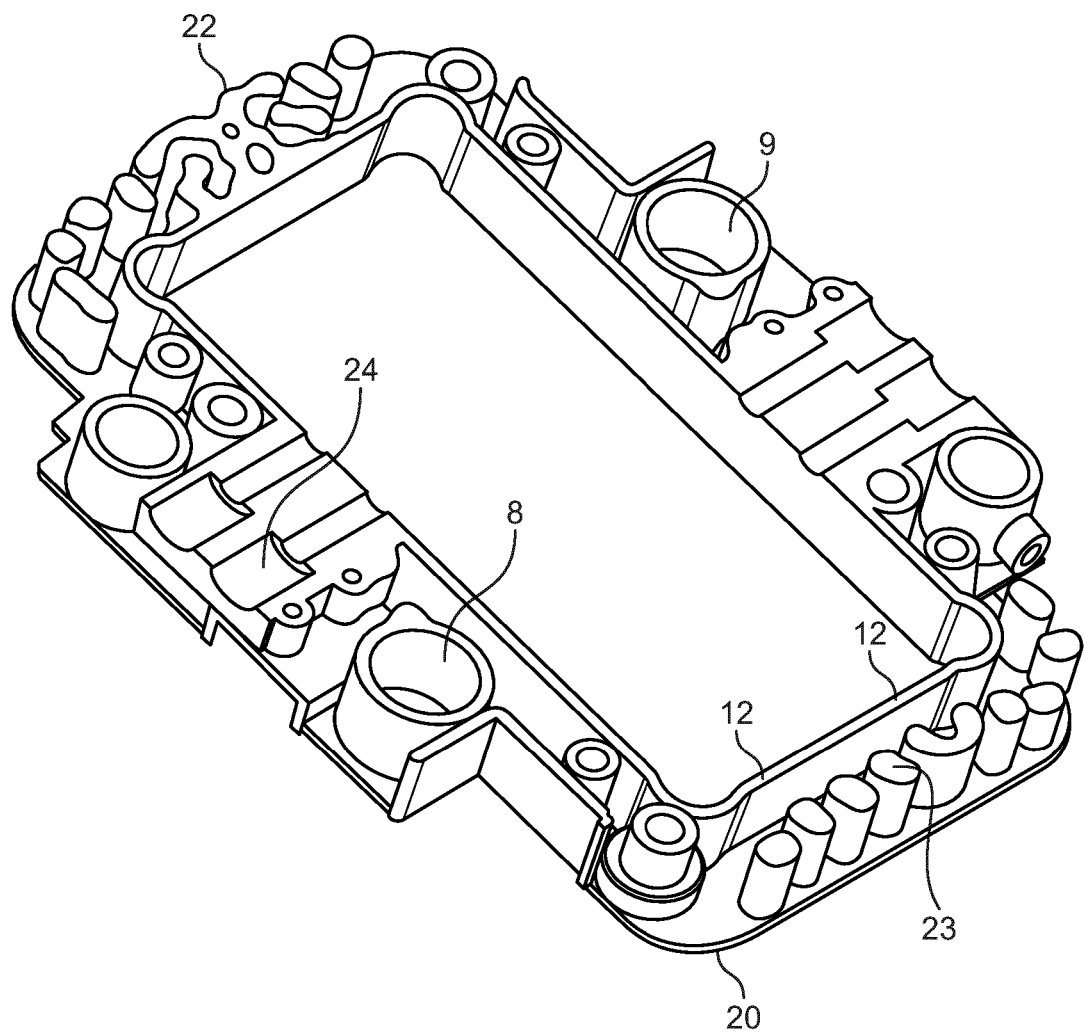
FIG. 4 is a perspective drawing showing the embodiment of the injection molding tool according to the disclosure as shown in FIGS. 1 and 2.

FIG. 4 shows a cross section through an alternative embodiment of a mold plate 5 according to FIGS. 2 and 3 where the periphery of the connection plates are not interconnected by the peripheral flange 21 shown in FIGS. 2 and 3. In this embodiment, a number of further reinforcing flanges 22 or rods 23 extend between the two connecting plates (only one shown in the drawing). Furthermore this cross section shows other elements, such as channels 24 adapted for leading coolant to the mold insert 6 that can be produced by additive manufacturing.

The one or more embodiments are described above by way of example only. Many variations are possible without departing from the scope of protection afforded by the appended claims.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiments. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology as exemplified by the appended claims.

What is claimed is:

1. An injection molding tool configured for being mounted in an injection molding apparatus for automated molding of work pieces in plastics, said injection molding tool, in its closed position, comprising:
   at least two separate mold plates each having:
      a mold insert socket with a mold insert attached in the mold insert socket,
      mutually opposite and parallel abutting side faces defining the thickness of the mold plate, and
      a number of mutually aligned guide bushings forming through holes adapted for axially sliding one of the at least two mold plates with respect to the other on a common guide pin in a direction perpendicular to the abutting side faces of the mold plates,
   wherein the guide bushings and the mold insert socket of at least one mold plate of the at least two separate mold plates are interconnected via one or more connection plates each extending parallel to the abutting side faces and having a thickness of less than half the at least one mold plate of the at least two separate mold plates thickness.

2. An injection molding tool according to claim 1, wherein the guide bushings and the mold insert socket of at least one mold plate of the at least two separate mold plates are interconnected via two mutually spaced connection plates.

3. An injection molding tool according to claim 2, wherein each of the two mutually spaced connection plates forms one of the mutually opposite and parallel abutting side faces.

4. An injection molding tool according to claim 2, wherein the mold insert socket and the guide bushings extends between the two connection plates.

5. An injection molding tool according to claim 4, further comprising a number of reinforcing flanges or rods extending between the two mutually spaced connection plates.

6. An injection molding tool according claim 2, wherein the outer periphery of the two mutually spaced connection plates are at least partly interconnected by a peripheral flange.

7. An injection molding tool according to claim 6, wherein the peripheral flange extends perpendicular to the mutually opposite and parallel abutting side faces.

8. An injection molding tool according to claim 7, wherein the at least two separate mold plates form a closed space extending between the two mutually spaced connection plates and the peripheral flange.

9. An injection molding tool according to claim 1, wherein the at least two separate mold plates are produced by additive manufacturing as single integral unit.

10. An injection molding tool according to claim 9, wherein the at least two separate plates are made from a polymer material.

11. An injection molding tool according to claim 8, wherein a support material used for additive manufacturing of the at least two separate mold plates is left inside the closed space.

12. An injection molding tool according to claim 1, wherein the mold insert is made from a metal material.

13. An injection molding tool according to claim 1, wherein the guide bushings each comprises a metal bushing mounted in a bushing socket formed as an integral part of the at least two separate mold plates.

14. An injection molding tool comprising:
two mold clamps positioned parallel each other via abutting side faces, the two mold clamps together forming a stack of a clamping plate, support plate, runner plate, runner channel plate, and a mold plate when the injection molding tool is in a closed position, wherein each plate of the stack defines: a centrally disposed mold insert socket; and two peripheral guide bushings such that one peripheral guide bushing on one plate of the stack is aligned with a similar peripheral guide bushing on another plate of the stack,
wherein the two mold clamps are configured for axial movement relative to one another along an axis defined by the peripheral guide bushings, and
wherein each plate of the stack forms an enclosure via two connection plates, the two connection plates joined by a peripheral flange.

15. The injection molding tool of claim 14, wherein each plate of the stack is formed by additive manufacturing from a polymer material.

16. An injection molding tool comprising:
a clamping plate;
a support plate;
a runner plate;
a runner channel plate; and
a mold plate, each of the clamping, support, runner, runner channel, and mold plates defining a centrally disposed mold insert socket and two peripheral guide bushings,
wherein the plates are configured for alignment such that one peripheral guide bushing on all of the plates is aligned, forming a through hole extending through all of the plates when the injection molding tool is in a closed position, the plates configured for axial movement relative to each other along an axis of the through hole, and
wherein each plate forms an enclosure via two connection plates, the two connection plates joined by a peripheral flange.

17. The injection molding tool of claim 16, wherein each plate is formed by additive manufacturing from a polymer material.

* * * * *